(12) United States Patent
Colon-Bonet

(10) Patent No.: US 6,738,795 B1
(45) Date of Patent: May 18, 2004

(54) SELF-TIMED TRANSMISSION SYSTEM AND METHOD FOR PROCESSING MULTIPLE DATA SETS

(75) Inventor: Glenn T Colon-Bonet, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 09/583,206

(22) Filed: May 30, 2000

(51) Int. Cl.$^7$ ................................................. G06F 7/38
(52) U.S. Cl. ....................................................... 708/490
(58) Field of Search .................................. 708/490, 523, 708/551, 552, 495, 209, 501; 375/214

(56) References Cited

U.S. PATENT DOCUMENTS

| | | | |
|---|---|---|---|
| 5,040,190 A | * | 8/1991 | Smith et al. ................. 375/214 |
| 5,757,687 A | * | 5/1998 | Naffziger et al. ........... 708/501 |
| 5,798,952 A | | 8/1998 | Miller, Jr. et al. |
| 6,529,924 B1 | * | 3/2003 | Nowka ....................... 708/209 |

* cited by examiner

*Primary Examiner*—Kakali Chaki
*Assistant Examiner*—Chat Do

(57) ABSTRACT

The present transmission system disclosed herein efficiently communicates a plurality of data operands through a common digital device in a successive, self-timed manner. The transmission system is particularly suited for implementation in connection with shifting operations in a floating point (FP) fused multiply adder of a microprocessor. The transmission system includes an encoder that encodes mathematically-related first and second data operands from separate sets of paths having a first encoding scheme onto a common set of logic paths having a second encoding scheme. Further included is a device that processes the data operands successively in time and in a self-timed manner. The processed data operands are communicated to a decoder, which decodes the first and second data operands and communicates the data operands onto separate respective sets of paths having the first encoding scheme.

20 Claims, 12 Drawing Sheets

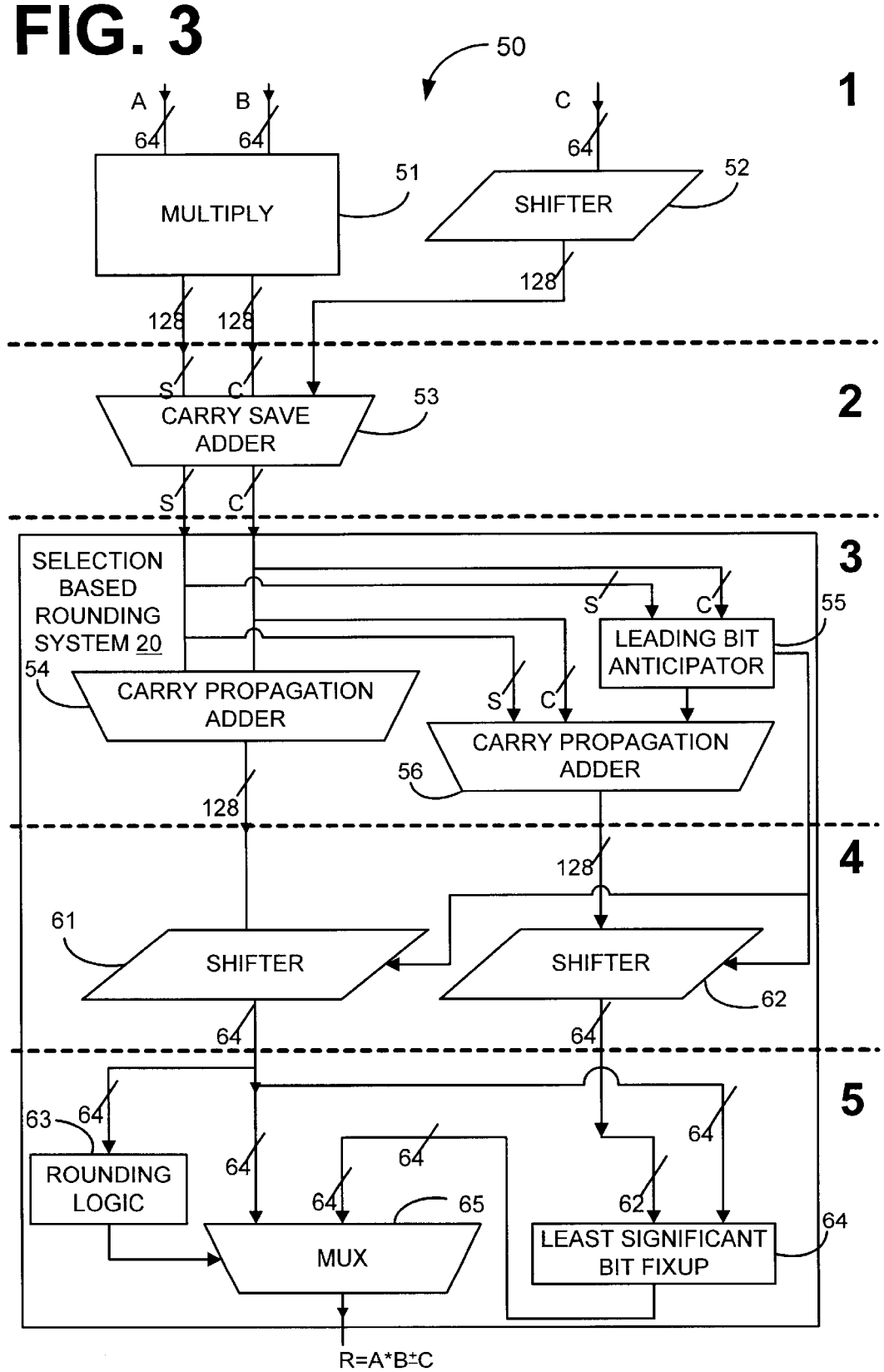

IDEAL
INCREMENT

```
         LSB
          ↓
SUM:    ...001011...
INC:  + ...000010...
        ─────────────
SUM+1:  ...00110x...
```

FIG. 4A

APPROXIMATE INCREMENT

```
         LSB
          ↓
SUM:    ...001011...         ...001011...
INC:  + ...0001xy...   OR  + ...00001xy...
        ─────────────       ─────────────
SUM+1:  ...00111, x=0        ...00110, x=0
        ...01001, x=1   OR   ...00111, x=1

WHERE △=1,2,3 OR 4      WHERE △=1 OR 2
```

FIG. 4B

| SIGNAL ($B_1$,$B_0$) | 2-TO-1 ENCODING $B_1$(H),$B_1$(L), $B_0$(H), $B_0$(L) | 4-TO-1 ENCODING E3,E2,E1,E0 |
|---|---|---|
| 00 | 0101 | 0001 |
| 01 | 0110 | 0010 |
| 10 | 1001 | 0100 |
| 11 | 1010 | 1000 |

FIG. 7D

| DATA $X_1X_0$ | DATA $Y_1Y_0$ | ENCODING X $E_3,E_2,E_1,E_0$ | ENCODING Y $E_3,E_2,E_1,E_0$ |
|---|---|---|---|
| 00 | 00 (X+0) | 0001 | 0101 |
| 00 | 01 (X+1) | 0001 | 1001 |
| 00 | 10   DC | DC | DC |
| 00 | 11 (X−1) | 0001 | 0011 |
| 01 | 00 (X−1) | 0010 | 0110 |
| 01 | 01   (X) | 0010 | 1010 |
| 01 | 10 (X+1) | 0010 | 0011 |
| 01 | 11   DC | DC | DC |
| 10 | 00   DC | DC | DC |
| 10 | 01 (X−1) | 0100 | 1100 |
| 10 | 10   (X) | 0100 | 0101 |
| 10 | 11 (X+1) | 0100 | 0110 |
| 11 | 00 (X+1) | 1000 | 1100 |
| 11 | 01   DC | DC | DC |
| 11 | 10 (X−1) | 1000 | 1001 |
| 11 | 11   (X) | 1000 | 1010 |

NOTE: DC = DON'T CARE

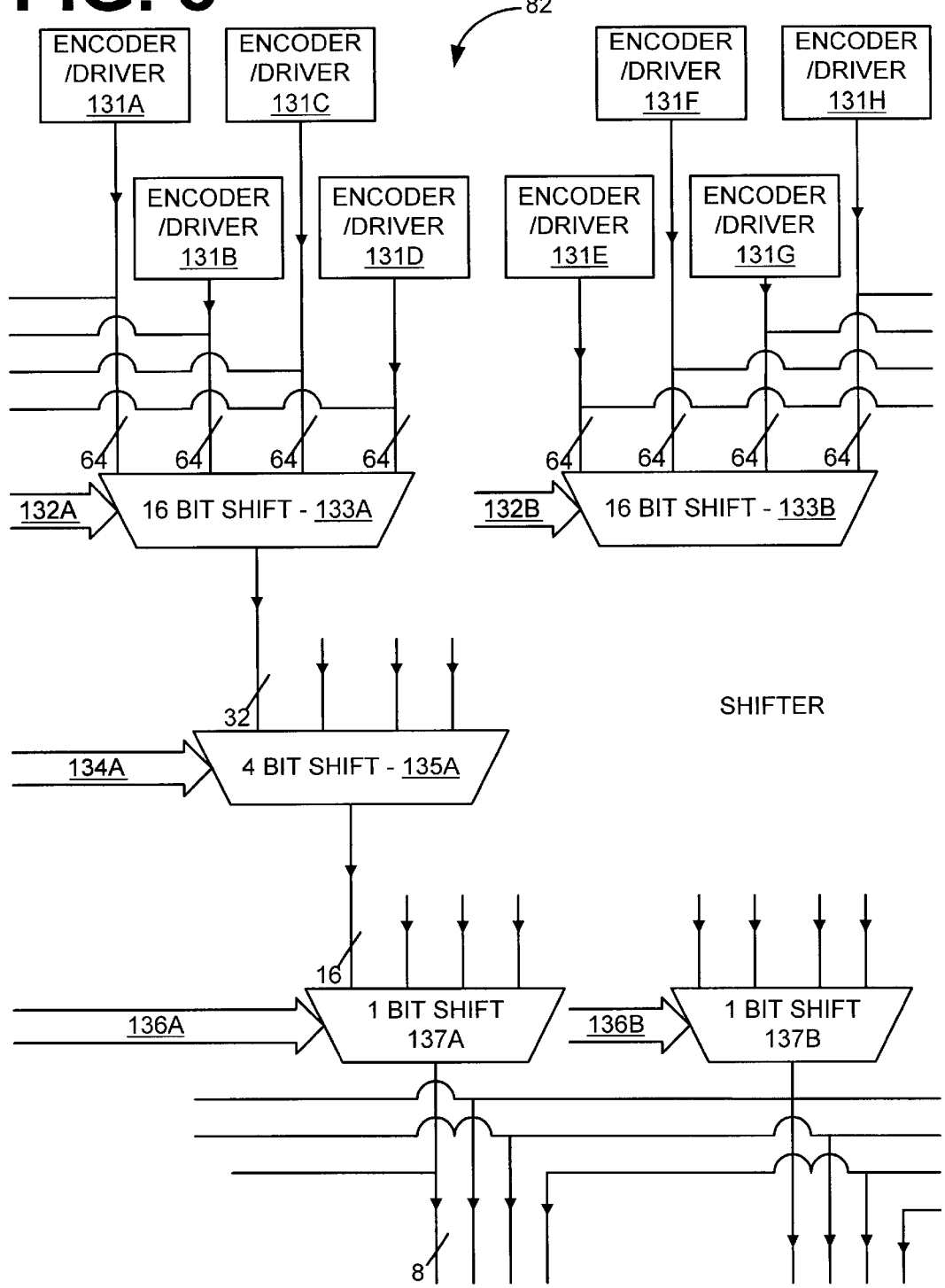

SELF-TIMED TRANSMISSION SYSTEM AND METHOD FOR PROCESSING MULTIPLE DATA SETS

TECHNICAL FIELD

The present invention generally relates to digital circuits and processors, and more particularly, to a self-timed transmission system and method for efficiently communicating multiple data sets through common digital circuit hardware in a self-timed manner in order to minimize hardware requirements. Although not limited to this particular application, the self-timed transmission system and method are particularly suited for implementation in connection with shifting operations in a floating point (FP) fused multiply adder of a high performance microprocessor.

BACKGROUND OF THE INVENTION

Currently, many arithmetic operations in present implementations of microprocessors are sped up by utilizing an on-board floating point (FP) processor, which implements FP mathematics (i.e., mathematics involving operation upon expressions having a significand and an exponent, where the value of each expression is equal to its significand multiplied by $2^{exponent}$), typically on very large numbers. These FP processors can include a fused multiply adder to increase the performance of the FP operations.

Fused multiply adders are well known in the art. In a typical fused multiply adder, two operands, for example, A and B, are multiplied together, and added to another operand C, so that the result R=A*B+C or the result R=A*B−C. Generally, in the circuitry, the operands A and B are first multiplied together, while the other operand C is shifted, and then the product of A and B is added to the shifted C. Next, the sum is normalized by a shifting operation., and finally, the shifted sum is rounded.

As in many FP operations, it is frequently required that a result of a FP operation be rounded. IEEE and other industry standards specify different types of rounding processes, for example, round to zero, round to nearest, round to negative infinity, and round to positive infinity. The computation of whether the resulting FP number needs to be rounded and the rounding process itself can significantly undesirably impede the performance and hardware complexity of the fused multiply adder.

The result R is provided in a form that is unincremented or that is incremented, in order to satisfy the rounding requirement. For example, if there were a rounding requirement of either round to zero or round to negative infinity, then the unincremented result R would be output. If there were a rounding requirement of round to positive infinity, then the incremented result R would be output. Further, if the rounding requirement were round to nearest, then either the incremented or unincremented result R would be output.

To more specifically explain the rounding/incrementing process, consider an example of a FP fused multiply adder with rounding capabilities shown in FIG. 1 and generally denoted by reference numeral 5. The fused multiply adder 5 of FIG. 1 is designed to operate upon the significand portions (nonexponent part) of FP numbers. As is well known in the art, the exponent portions of such FP numbers are processed separately from the significand portions, and such processing is not described here for simplicity. As shown in FIG. 1, the fused multiply adder 5 includes a multiplier 11 that receives and multiplies two numbers A, B (for example, 64-bits each). Shifter 12 shifts the operand C by a predetermined amount in order to normalize it with respect to the mathematical product of A and B and to thereby enable it to be appropriately combined with the product of A and B at a later time.

The sum and carry outputs (for example, 128 bits each) of the multiplier 11 and the output of the shifter 12 are input into carry save adder 13, the design and operation of which is well known in the art. The sum and carry data from multiplier 11 are input to the carry save adder 13 as the addend and augend, respectively. The input from the shifter 12 is considered the carry-in from a less significant stage of the FP fused multiply adder 5. The carry save adder 13 generates a sum output and a carry output. Both the sum and carry outputs are input into a carry propagation adder 14 and a leading bit anticipator 15. The carry propagation adder 14 combines the sum and carry output from the carry save adder 13 to produce a FP number that is input into shifter 16. The design and operation of a carry propagation adder is also well known in the art.

The leading bit anticipator 15 computes a shift number that is equal to the number of significant bits to be shifted out to eliminate the leading zeros in the FP number generated by the carry save adder 13. The leading bit anticipator 15 also computes the shift number in a particular direction. This is done in order to determine the normalization of the sum and carry output of the carry save adder 13, for add, subtract, multiply or divide operations. An example of one of many possible architectures for the leading bit anticipator 15 is described in U.S. Pat. No. 5,798,952 to Miller el al.

The shift number generated by the leading bit anticipator 15 is input into shifter 16. Shifter 16 then performs a shifting operation on the FP number. The FP number is shifted by a number of bits equal to the shift number generated by the leading bit anticipator 15. Shifter 16 performs the function of shifting the FP number to the right or left alternatively as directed by the shift number. This is to eliminate the leading zeros of the FP number (i.e., normalizes the resulting FP number). The resulting normalized FP number is input into incrementor 17, rounding logic 18, and multiplexer (MUX) 19.

The incrementor 17 increments the normalized FP number to provide an incremented normalized FP number. The incrementor 17 inputs the incremented normalized FP number into MUX 19.

The rounding logic 18 determines if the normalized number output from shifter 16 requires rounding and the type based upon the examination of guard, round, and sticky bits associated with the output from shifter 16. The rounding logic 18 directs MUX 19 to select either the unincremented number or the incremented number for ultimate output from the FP fused multiply adder 5.

A major problem with the rounding architecture for a conventional FP fused multiply adder is that until the number resulting from a FP operation is normalized, it is very difficult, if not impossible, to determine whether the normalized result requires rounding. Since the incrementing of a result of a FP operation is performed after the normalization, extra time is needed to complete the FP operation. Furthermore, the incrementor is disadvantageous, as it can add many undesirable gate delays, i.e., at least $\log_2 N$ gate delays where N is the number of bits. Both of the foregoing significantly compromises the performance of the fused multiply adder 5.

Thus, a heretofore unaddressed need exists in the industry for a way to address the aforementioned deficiencies and inadequacies, particularly, a way to better perform rounding, or incrementing, in a fused multiply adder 5.

SUMMARY OF THE INVENTION

The present invention provides a self-timed transmission system and method efficiently communicate a plurality of data operands successively through common digital device, for example, a shifter, bus network, multiplexer (MUX), or buffer, in a self-timed manner in order to minimize hardware requirements. Although not limited to this particular application, the self-timed transmission system and method are particularly suited for implementation in connection with shifting operations in a floating point (FP) fused multiply adder of a high performance microprocessor.

In architecture, at least one embodiment of the self-timed transmission system can be constructed as follows. An encoder encodes first and second data operands that are each defined on separate respective first and second sets of logic paths onto the same third set of logic paths by changing the encoding scheme. This re-encoding scheme is possible because the first and second data operands are mathematically related. In this embodiment, the first and second data operands are each defined on 2 monotonic logic paths, and the third set of logic paths defines each operand, spaced in time, on 4 monotonic logic paths. In this implementation example, the first and second data values differ by no more than 1 bit (assuming values X and Y, they will exhibit the following mathematical relationship: X=Y or X=Y−1). Note that other encoding schemes and mathematical relationships are possible. A device, for example, a shifter, bus network, multiplexer, or buffer, processes the first and second data separately, successively in time, and in a self-timed manner, and communicates the processed first and second data onto a fourth set of logic paths. A decoder receives the processed first and second data in succession from the device on the fourth set of logic paths. The decoder decodes the first and second data onto separate respective fifth and sixth sets of logic paths, which have an encoding that corresponds to the original first and second sets of logic paths.

The present invention can also be viewed as providing one or more methods. One such method can be broadly conceptualized as a process (for example, for a FP fused multiply adder) having the following steps: (a) encoding first and second data that are each defined on separate respective first and second sets of logic paths having a common encoding scheme onto the same third set of logic paths, the third set of logic paths having a different encoding scheme than the first and second sets of logic paths; (b) processing the first and second data separately, successively in time, and in a self-timed manner, while maintaining a one-to-one correspondence between input encoding and output encoding of the first and second data; (c) communicating the processed first and second data onto a fourth set of logic paths; and (d) decoding the first and second data from the fourth set of logic paths onto separate respective fifth to and sixth sets of logic paths that correspond in terms of encoding scheme to the first and second sets of logic paths.

Other systems, methods, features, and advantages of the present invention will become apparent to one with skill in the art upon examination of the following drawings and detailed description. It is intended that all such additional systems, methods, features, and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a block diagram of a first embodiment of a FP fused multiply adder that employs the selection based rounding system of FIG. 2.

FIG. 4A is a mathematical diagram showing an ideal incrementing process.

FIG. 4B is a mathematical diagram showing an approximate incrementing process that is performed collectively by the leading bit anticipator and a carry propagation adder associated with the selection based rounding system of FIGS. 2 and 3.

FIG. 7D is a truth table showing the dynamic logic translation that occurs along the self-timed transmission system of FIG. 6.

FIG. 8 is a block diagram of a shifter of FIG. 6.

DETAILED DESCRIPTION OF THE PREFERRED EMBODIMENTS

Figure 2:
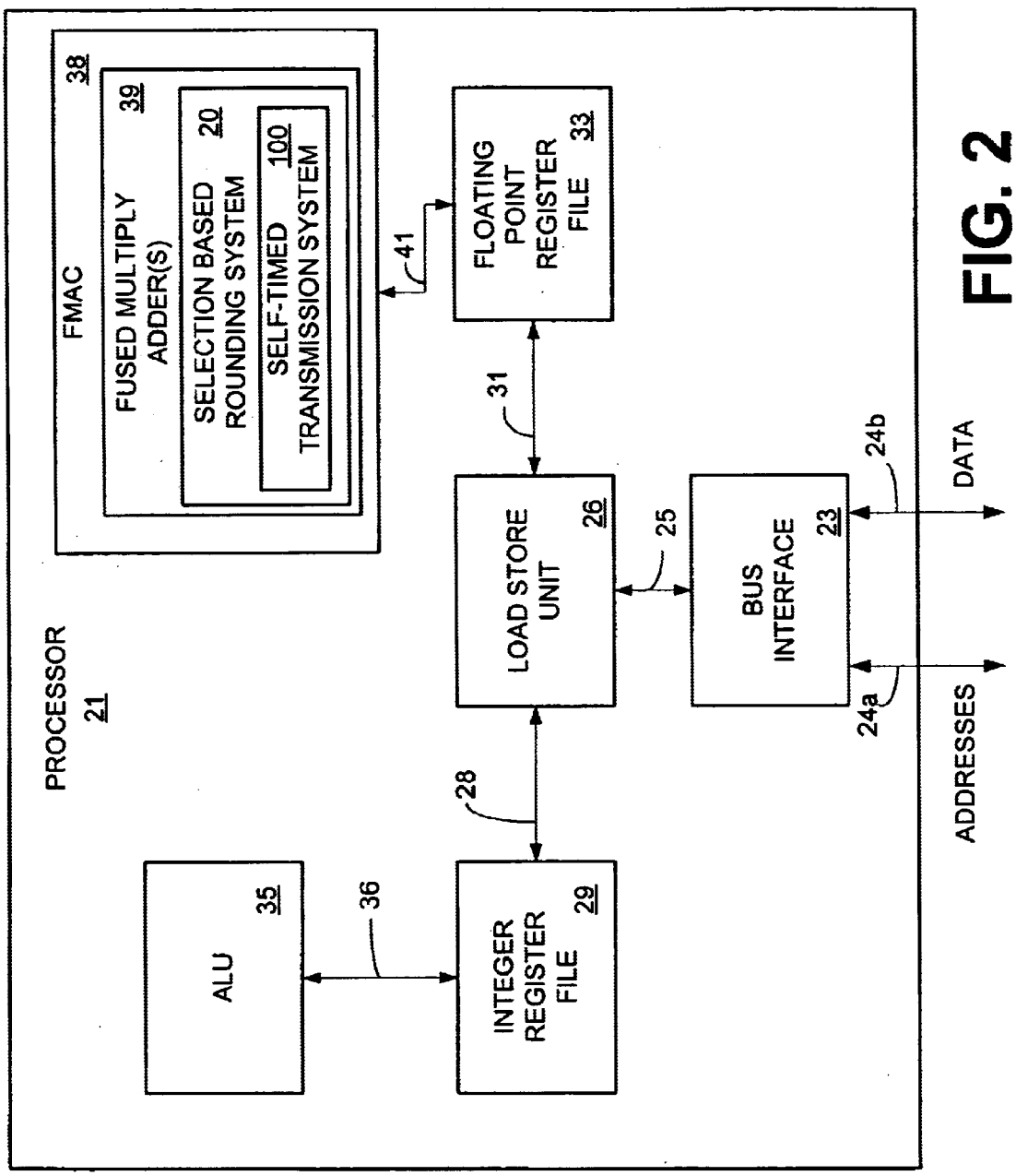
FIG. 2 is a block diagram of a microprocessor employing a selection based rounding system.

FIG. 2 is a block diagram of a processor 21 having a fused multiply adder(s) 39 employing the self-timed transmission system 100 (FIG. 5) of the present invention within a selection based rounding system 20 of the fused multiply adder(s) 39. With the exception of the selection based rounding system 20 and the self-timed transmission system 100, all of the following elements are well known and well understood in the art, and only a brief explanation of their associated functions is described for simplicity. The processor 21 can be, for example but not limited to, a microprocessor microchip fabricated in accordance with well known fabrication techniques. As illustrated in FIG. 2, in architecture, the processor 21 includes a bus interface 23 designed to communicate addresses 24a and data 24b. A load store unit 26 performs the function of managing data exchange between a remote device (not shown for simplicity; e.g., memory, an input/output (I/O) device, etc.) and the processor 21. Said another way, the load store unit 26 is designed to perform loads and stores of data in an integer register file 29, a FP register file 33, and the remote device. An arithmetic logic unit (ALU) 35 accesses (reads from and writes to) the integer register file 29 and performs mathematical operations upon integers. A FP multiply accumulate unit (FMAC) 38 accesses the FP register file 33 and performs mathematical operations upon FP numbers. The FMAC 38 may employ one or more fused multiply adders 39, which may implement the self-timed transmission system 100 of the present invention.

A. First Embodiment of Fused Multiply Adder

Figure 5:
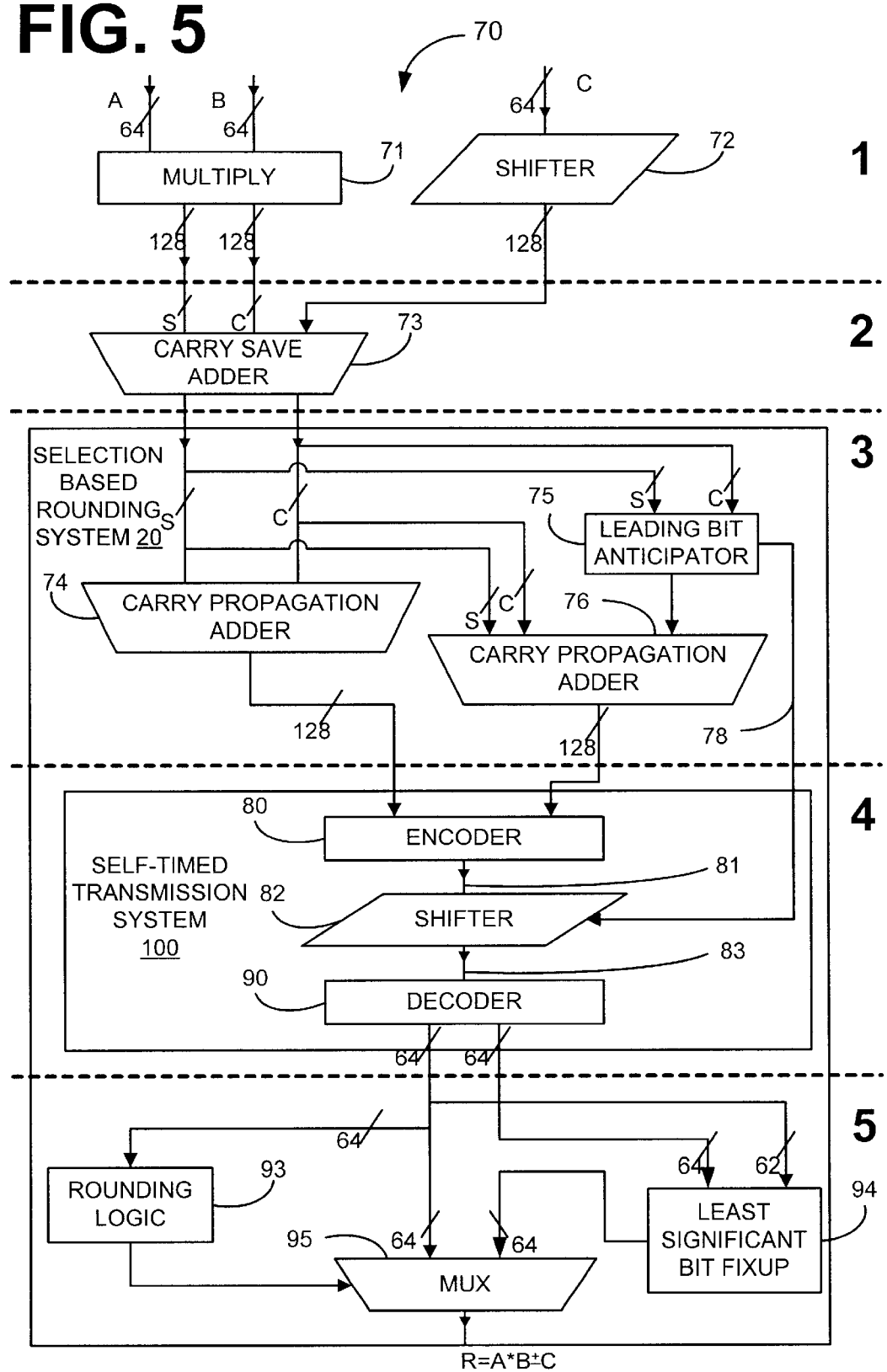
FIG. 5 is a block diagram of a second embodiment of a FP fused multiply adder that employs the selection based rounding system of FIG. 2 and the self-timed transmission system of the present invention.

Illustrated in FIG. 3 is a first embodiment (a possible nonlimiting example) of a FP fused multiply adder, generally denoted by reference numeral 50, that employs a selection based rounding system 20 (FIG. 2). The fused multiply adder 50 (as well as the second embodiment in FIG. 5) is designed to operate upon the significant portions (nonexponent part) of FP numbers within a processor or other digital circuit. Unlike the second embodiment (FIG. 5), this first embodiment does not employ the self-timed transmission system 100, but is shown and described to clearly illustrate the application of the self-timed transmission system 100 in the second embodiment (FIG. 5).

Note a related copending U.S. patent application entitled, "Selection Based Rounding System And Method For Floating Operations," having Ser. No. 09/583,362, filed on May 30, 2000, and herein incorporated by reference. The foregoing application is directed to, among other things, the broad concept of the selection based rounding system 20.

In the fused multiply adder 50, two operands, for example, A and B, are multiplied together, and added to another operand C, so that the result R=A*B+C, or alternatively, the result R=A*B−C. The subtraction of C is performed essentially by taking the 2's complement of C and adding it to the product A*B. Moreover, the result R is provided in a form that is unincremented or that is incremented, in order to satisfy a rounding requirement. For example, if there were a rounding requirement of either round to zero or round to negative infinity, then the unincremented result would be output. If there were a rounding requirement of round to positive infinity, then the incremented result would be output. Finally, if there were a rounding requirement of round to nearest, then either the unincremented result or the incremented result would be output.

Figure 1:
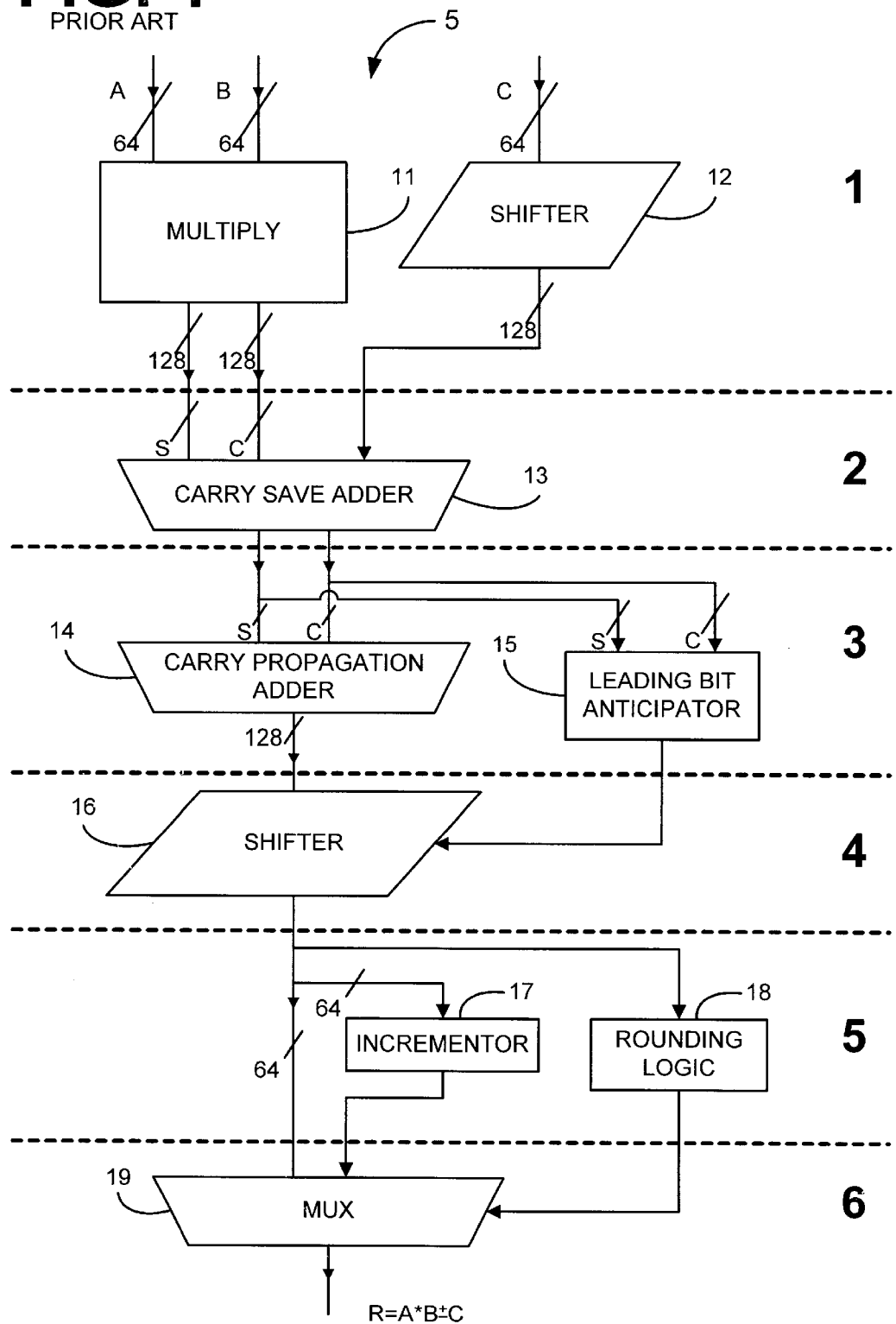
FIG. 1 is block diagram of a fused multiply adder of the prior art that implements undesirable a post increment based rounding system.

For readily comparing the performance of the fused multiply adder 50 in FIG. 3 to that of the prior art fused multiply adder 5 (FIG. 1), the fused multiply adder 50 is segregated, or divided, into timing sections, that include logic operations occurring in roughly the same timing period. In essence, each of the timing sections corresponds to one or more logic gate delays. As can be seen in FIG. 3, the FP fused multiply adder 50 is segregated, or divided, into five timing periods. In those cases where a plurality of logic is within the same timing period, the logic operations are performed approximately concurrently. As is clear by comparing the timing sections of the adder 50 of FIG. 3 that employs the selection based rounding system 20 (FIG. 2) with those timing sections of the prior art fused multiply adder 5 (FIG. 1), the fused multiply adder 50 of the present invention is much faster than the prior art adder 5. There are less timing sections in FIG. 3 than in FIG. 1. In fact, in terms of gate delays, the increase in speed is likely around 5 to 6 gate delays, which is significant in processor design.

As further shown in FIG. 3, the fused multiply adder 50 includes a multiplier 51 that receives and multiplies two numbers A, B (for example, 64-bits each). Shifter 52 shifts the operand C by a predetermined amount in order to normalize it with respect to the mathematical product of A and B and to thereby enable it to be appropriately combined with the product of A and B at a later time.

The sum and carry outputs (for example, 128 bits each) of the multiplier 51 and the output of the shifter 52 are input into carry save adder 53, the design and operation of which is well known in the art. The sum and carry data from multiplier 51 are input to the carry save adder 53 as the addend and augend, respectively. The input from the shifter 52 is considered the carry-in from a less significant stage of the FP fused multiply adder 50. The carry save adder 53 generates a sum output and a carry output. Both the sum and carry outputs are input into a carry propagation adder 54 and a leading bit anticipator 55. The carry propagation adder 54 combines the sum and carry output from the carry save adder 53 to produce a FP number that is input into shifter 61.

The leading bit anticipator 55 computes, among other things, a shift number that is equal to the number of significant bits to be shifted out to eliminate the leading zeros in the FP number generated by the carry save adder 53. The leading bit anticipator 55 also computes the shift number in a particular direction. This is done in order to normalize of the sum and carry output of the carry save adder 53, for add, subtract, multiply or divide operations. An example of one of many possible architectures for the leading bit anticipator 55 in FIG. 3 is described in U.S. Pat. No. 5,798,952 to Miller et al., which is incorporated herein by reference.

The leading bit anticipator 55 can also calculate where the most significant bit (MSB) is located in the FP number generated by the carry save adder 53. Once the location of the MSB is determined, it is then possible to estimate the position of the LSB within 1 bit, since the bit-width of the device is known and since there is a known relationship between the unincremented number and the incremented number (the incremented number unincremented= number or unincremented number±1). The bit-width of the device can be any suitable size n, for example, 4, 8, 16, 32, 64, 128, 256, 512, etc. In the preferred embodiments, the bit-width is 64 bits. The shift is estimated to be (n−1), or 63 bits, in the preferred embodiments, and this shift will be exact or within one bit.

Once the position of the LSB is estimated, it is then possible to compute an approximate incremented FP number by adding 1 to the estimated LSB of the FP number. As illustrated in FIG. 4A, as an example, assume that the number SUM is output from the carry save adder 53 and exhibits the following binary sequence: . . . 001011. . . . In order to round the number, it is incremented by 1 in the LSB position. So, therefore, an increment word INC=. . . 000010. . . is added to the SUM=. . . 001011. . . in order to generate the incremented FP number SUM+1=. . . 00110x . . . , where x could be either 1 or 0.

However, the LSB position is merely an estimate. As illustrated in FIG. 4B, the estimated LSB position may be exact or off by a bit and, therefore, in terms of the incremented number SUM+1, it may be off by Δ1, 2, 3, or 4.

Accordingly, referring back to FIG. 3, the leading bit anticipator 55 communicates an LBA word having a bit with binary logic state 1 to the carry propagation adder 56 that is shifted to the right by 63 bits from the bit location of the identified MSB of the number from the carry save adder 53. Preferably, the shift is implicitly accomplished by a hard-wired connection (i.e., output bit connection j of the anticipator 55 connected to input bit connection j-63 of the adder 56) between the leading bit anticipator 55 and the carry propagation adder 56.

The carry propagation adder 56 computes an approximate incremented version of the FP number generated by the carry save adder 53 by adding the 1 from the leading bit anticipator 55 to the sum and carry outputs from the carry save adder 53. This provides a rounding up, or incrementing, of the FP number.

Both the unincremented and approximate incremented FP numbers are input into shifters 61, 62, respectively, for normalization. The shift number computed by the leading bit anticipator 55 is equal to the bits to be shifted in order to eliminate the leading zeros in the FP number generated by the carry save adder 53. The shifters 61, 62, normalize the respective unincremented and approximate incremented FP numbers by shifting the FP numbers to the right or the left by the shift number. The shift, operations normalize the numbers to within 1 bit of accuracy.

The normalized unincremented FP number from the shifter 61 is next input into a MUX 65.

The normalized approximate incremented FP number from shifter 62 has its two LSBs truncated, because these two bits may be inaccurate as a result of the previously described LSB estimation (and the approximate increment), and the truncated number is forwarded to the LSB fixup mechanism 64.

Figures 4C, 4D:
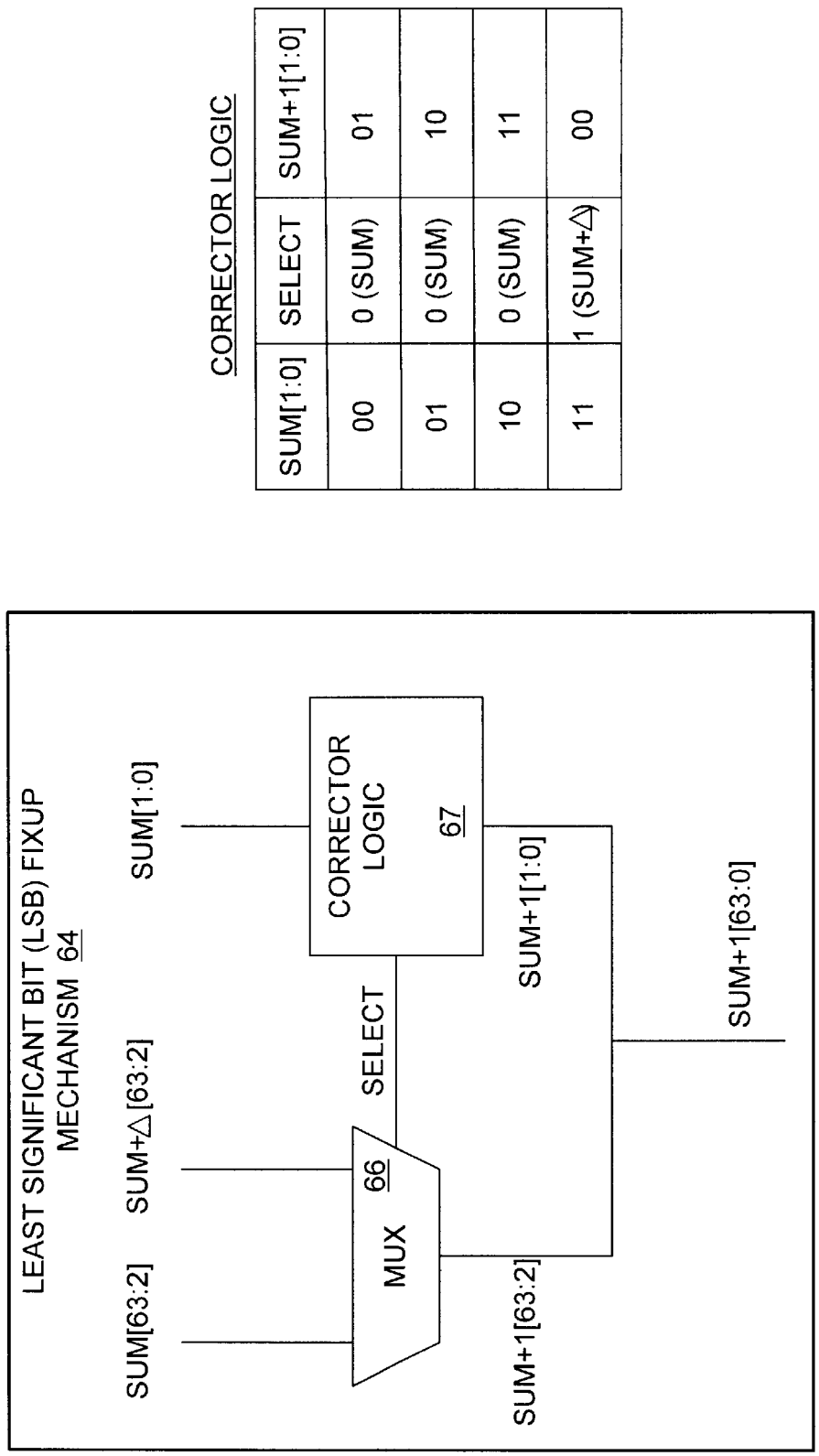
FIG. 4C is a block diagram of the LSB fixup mechanism of FIG. 3.
FIG. 4D is a truth table showing the logic implemented by the LSB fixup mechanism of FIGS. 3 and 4C.

The LSB fixup mechanism 64 is constructed as shown in FIG. 4C. The LSB fixup mechanism 64 includes a multiplexer (MUX) 66 controlled by way of a select signal produced by corrector logic 67. The corrector logic 67 is configured to implement the logic defined by the truth table of FIG. 4D. As shown in FIG. 4C, the MUX 66 receives the part SUM[63:2] of the normalized unincremented FP number SUM and the part SUM+Δ[63:2] of the normalized approximate incremented FP number SUM+Δ and outputs the part SUM+1 [63:2] of the accurate normalized incremented FP number SUM+1. The corrector logic 67 receives the part SUM[1:0] and outputs SUM+1 [1:0]. Finally, SUM+1 [63:2] is combined with SUM+1[1:0] in order to derive an accurate normalized incremented FP number SUM+1 [63:0] for output to the MUX 65 (FIG. 3).

Thus, the LSB fixup mechanism 64 and the corrector logic 67 operate as follows, with reference to both FIGS. 4C and 4D. First, if the two LSBs, or SUM[1:0], of the normalized unincremented FP number SUM are "00" respectively, then the corrector logic 67 outputs a select signal of "0" to the MUX 66, which causes a selection of SUM[63:2] to be output as SUM+1[63:2], and furthermore, the corrector logic 67 also outputs "01" as the bits SUM+1[1:0], which are combined with SUM+1[63:2] to create SUM+1[63:0]. Second, if the two LSBs, or SUM[1:0], of the normalized unincremented FP number SUM are "01" respectively, then the corrector logic 67 outputs a select signal of "0" to the MUX 66, which causes a selection of SUM[63:2] to be output as SUM+1[63:2], and furthermore, the corrector logic 67 also outputs "10" as the bits SUM+1[1:0], which are combined with SUM+1[63:2] to create SUM+1[63:0]. Third, if the two LSBs, or SUM[1:0], of the normalized unincremented FP number SUM are "10" respectively, then the corrector logic 67 outputs a select signal of "0" to the MUX 66, which causes a selection of SUM[63:2] to be output as SUM+1[63:2], and furthermore, the corrector logic 67 also outputs "11" as the bits SUM+1[1:0], which are combined with SUM+1[63:2] to create SUM+1[63:0]. Finally, if the two LSBs, or SUM[1:0], of the normalized unincremented FP number SUM are "11" respectively, then the corrector logic 67 outputs a select signal of "01" to the MUX 66, which causes a selection of SUM+Δ[63:2] to be output as SUM+1[63:2], and furthermore, the corrector logic 67 also outputs "00" as the bits SUM+1[1:0], which are combined with SUM+1[63:2] to create SUM+1[63:0].

With reference back to FIG. 3, the resulting normalized unincremented FP number SUM generated by shifter 61 is input into a rounding logic 63. The rounding logic 63 determines if the normalized unincremented output from shifter 61 requires rounding and the rounding type (for example, round to zero, round to nearest, round to negative infinity−∞, and round to positive infinity+∞) based upon the examination of guard, round, and sticky bits associated with the output from shifter 61. The rounding logic 63 directs MUX 65 to select either the normalized unincremented FP number SUM or the normalized incremented FP number SUM+1 to be output from the FP fused multiply adder 50 as the result R.

B. Second Embodiment of Fused Multiply Adder

FIG. 5 is a block diagram of a second embodiment of a FP fused multiply adder, generally denoted by reference numeral 70, that employs the selection based rounding system 20 (FIG. 2) and, significantly, the self-timed transmission system 100 of the present invention. The FP fused multiply adder 70 is segregated, or divided, into timing sections, that include logic operations occurring in roughly the same timing period. As can be seen in FIG. 5, the FP fused multiply adder 70 is segregated into five timing periods, which makes the adder 70 faster than the prior art fused multiply adder 5 (FIG. 1) and about the same speed as the first embodiment of the fused multiply adder (FIG. 3). However, the second embodiment has the significant advantage of less hardware than the first embodiment, as will be described hereafter.

The functionality of multiplier 71, shifter 72, carry save adder 73, carry propagation adder 74, leading bit anticipator 75 and carry propagation adder 76 of FIG. 5 are all essentially the same as corresponding elements 51–56 described above relative to the first embodiment of FIG. 3. The principal difference between the first embodiment and the second embodiment is that the second embodiment utilizes a self-timed transmission system 100, which normalizes both the incremented and unincremented FP numbers in a shared communication path having a normalizing shifter 82, and the path is self-timed. Thus, the second embodiment saves the expense of one shifter.

The self-timed transmission system 100 of the fused multiply adder 70 in accordance with the second embodiment generally utilizes the following: an encoder 80, shifter 82, and decoder 90. The encoder 80 essentially interleaves the unincremented FP number SUM and the approximate incremented FP number SUM+Δ along the common path 81. The shared shifter 82 is interconnected with the encoder 80 for receiving successively the unincremented FP number SUM and the approximate incremented FP number SUM+Δ and for normalizing the same successively. The decoder 90 essentially de-interleaves the normalized incremented and unincremented FP numbers from the common processing path.

The shifter 82 shifts the encoding data the required bits to the left or the required bits to the right. The shifter 82 is directed by input 78 from the leading bit anticipator 75, on the required number of bits to shift the encoded numbers and the direction of the shift. The normalized encoded output of shifter 82 is then input into decoder 90.

The functionality of rounding logic 93, LSB fixup mechanism 94, and MUX 95 are essentially the same as corresponding elements 63–65 described above in regard to the first embodiment of FIG. 3.

C. Self-Timed Transmission System

The architecture, functionality, and operation of the self-timed transmission system 100 of FIG. 5 will now be described in detail. The self-timed transmission system and method(s) of the present invention can be implemented in connection with any device, mechanism, or apparatus, for example but not limited to, a shifter, bus network, MUX, buffer, etc., where there is essentially a one-to-one correspondence between input encoding and output encoding of the data that is processed. Moreover, the self-timed transmission system 100 can be implemented in any processor (e.g., a chip based microprocessor, etc.) or other suitable digital circuit, either of which, in turn, can be implemented in any computer (e.g., a personal computer, workstation, etc.) or other suitable digital device.

1. Overview

Figure 6:
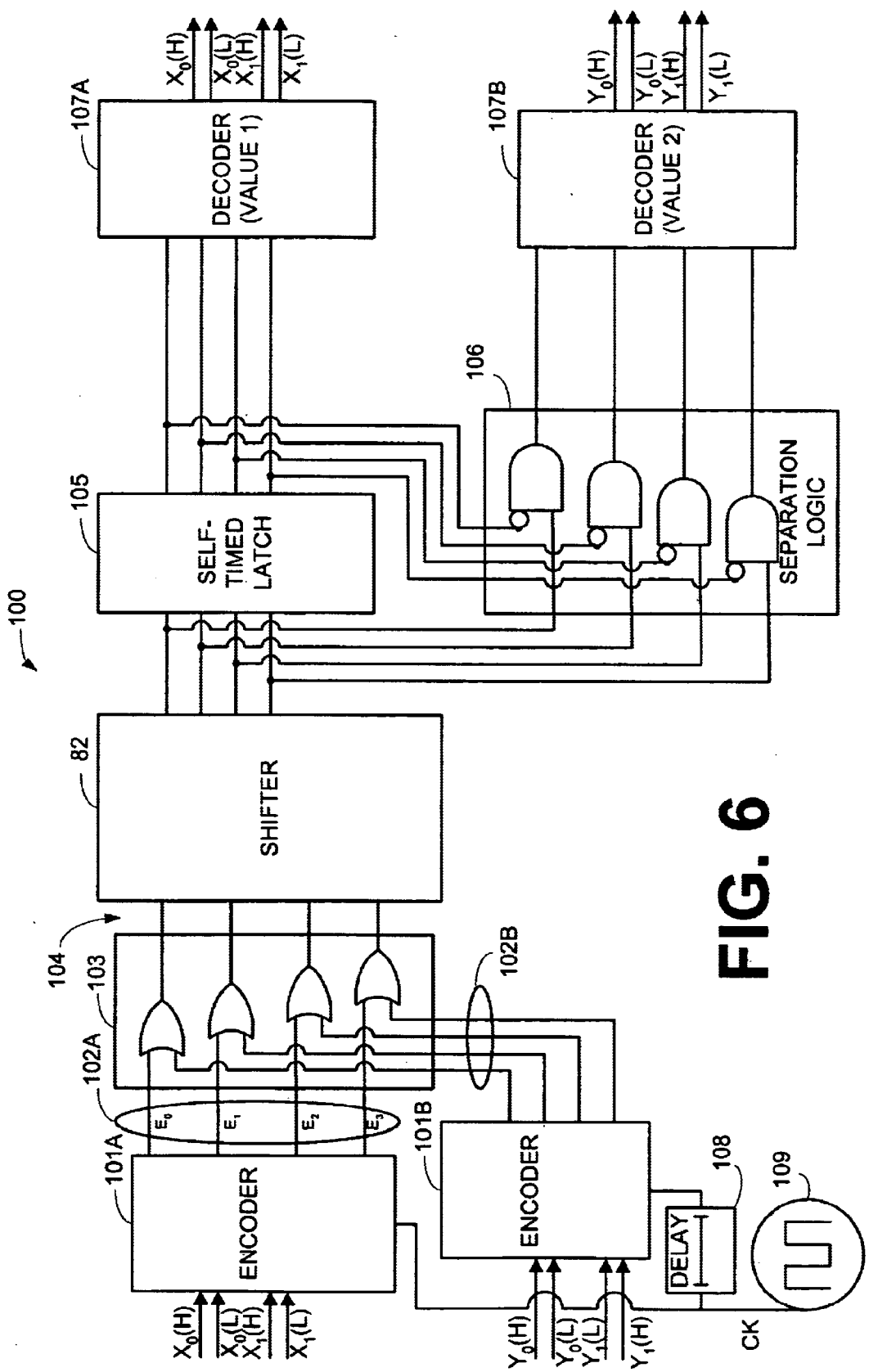
FIG. 6 is a block diagram of the self-timed transmission system of FIG. 5.

Illustrated in FIG. 6 is an example (a nonlimiting implementation; others are possible) of a possible and preferred system architecture for the self-timed transmission system 100 (FIG. 5). As shown in FIG. 6, the self-timed transmission system 100 can be constructed as follows.

In general, in the preferred embodiment, encoders 101A, 101B encode first data $X_n \ldots X_1 X_0$ and second data $Y_n \ldots Y_1 Y_0$, respectively, using self-timed dynamic (precharged) logic, for example but not limited to, dynamic mousetrap logic or dynamic domino logic. In the context of this document, "self-timed" means that logic evaluations occur asynchronously with respect to (independent of) clocking. The logic state of each bit of each input word X, Y is defined collectively by H, L connections, corresponding with logic high (1) and logic low (0), respectively. Moreover, a monotonic progression is implemented so that the logic state of each bit is defined by whether or not there has been a low (0) to high (1) transition on either the H or L connection. Note that the encoding scheme can be more than a dual rail scheme, such as an n-rail encoding scheme, where n is 3 or more.

The encoders 101A, 101B redefine the encoding of the inputs (FIG. 7C) by translating them from a 2-bit/4-line encoding scheme, where each bit is defined by 2 lines by whether one of them transitions from low to high, to a 2-bit/4-line encoding scheme, where 2 bits are defined collectively by whether one of the lines transitions from low to high. As an example, initially, the logic state of bit $X_0$ of the first operand is defined by the set of $X_0(H)$ and $X_0(L)$, and the logic state of its neighboring bit $X_1$ in the same operand is defined by the set of $X_1(H)$ and $X_1(L)$. After encoding by encoders 101A, both X1 and X0 are defined by the set of logic values $E_3$, $E_2$, $E_1$, $E_0$, that is transmitted on the connection 102A. Note that the foregoing translation in encoding is performed on all 64 bits of operand X as well as operand Y.

Encoders 101A, 101B, are both periodically precharged by clock 109, which is designed to precharge the dynamic logic during one half clock period (cycle) and permit logic evaluation (and discharge) during the other half logic period. The clock signal for driving encoder 101B is routed through delay circuit 108. This delay allows the first data value to be encoded by encoder 101A. The encoding of the first data value X is prior to the encoding of the successive second data value Y by encoder 101B. That delay of driving the second data value Y by encoder 101B allows encoder 101A to drive the first data value X on the interface 102A first. Utilizing the encoding method of the present invention enables one of the four output lines 102A to transmit an encoded value representing the first data value X that is input into encoder 101A. Next, encoder 101B drives the second data value Y onto one of the four lines 102B utilizing the encoding scheme of the present invention. This enables one of the remaining three output lines 102B to transmit the encoded second data value Y that is input into encoder 101B.

In accordance with another feature of the encoding scheme, note that the input lines $Y_1(H)$, $Y_1(L)$ pertaining to input bit $Y_1$ of the second operand Y are purposefully reversed as compared to those pertaining to the input bit $X_1$ of the first operand X. This reversal ensures that the encoding of the first data value X on the set of lines 102A ($E_3$, $E_2$, $E_1$, $E_0$) does not coincide with the encoding of the second data value Y on the set of lines 102B. Because there is a known mathematical relationship between the first and second data values X, Y (X=Y or X=Y±1), then switching the lines will result in the second data value Y (and shifted second data value) being at least 2 in number away from the first data value X (and shifted first data value), and accordingly, there will be no overlap in a low-to-high transition (0 to 1) on the set of monotonic lines $E_3$, $E_2$, $E_1$, $E_0$ when they are ultimately latched at a post-shifter latch 105. This signal swap will be later reversed back to the original encoding by the decoder 107B that outputs the shifted second data value Y. Encoders 101A, 101B will be described in further detail with regard to FIGS. 7A through 7C later in this document.

A merging logic block 103 receives both the first and second encoded values in succession. Merging logic block 103 includes a plurality of "OR" logic gates that transmit the first and second encoded values, spaced in time, along the common communication path comprising four monotonic lines 104, to the shifter 82. The merging logic block 103 essentially transmits two bits of encoded data, spaced in time, on the four lines 104 (i.e., two of which will transition from 0 to 1) to the shifter 82. This transmission is of a self-timed monotonic nature. The self-timed method reduces the number of requisite lines to transmit the first and second encoded values and speeds upon manipulation of the first and second data X, Y so that both data operands can be operated upon by the same hardware.

The first and second data values X, Y are transmitted through the shifter 82, successively spaced in time, and in a self-timed nature that does not require or rely on a clock for synchronizing the data transmission. The result of the shifting operation is shifted first and second data values X, Y with noninterfering encodings. An example of a specific implementation of the shifter 82 will be described in further detail later in this document with regard to FIG. 8.

Data output from the shifter 82 is input into a self-timed latch 105 and, in parallel, into a separation logic 106. The self-timed latch 105 captures the shifted first data value X and does not capture the shifted second data value Y. This enables ultimate separation of the values X, Y. The architecture and operation of the self-timed latch 105 will be described in detail with regard to FIG. 9 later in this document.

The first encoded data value X is transmitted in a self-timed manner from the self-timed latch 105 to the decoder 107A. The decoder 107A decodes the shifted first encoded data value X from 4-to-1 encoding (4 lines define a 2-bit operand) into the original 2-to-1 encoding (2 lines define a 1-bit operand) that pertained to the first data X for further subsequent processing.

The separation logic 106 is designed to filter out the shifted second data value Y from the shifted first data value X. The separation logic 106 receives the first and second encoded values X, Y from the output of the shifter 82 and the output of the self-timed latch 105, inverts the latch outputs, and passes the logic signals from corresponding lines through respective AND logic gates, as shown in FIG. 6. The isolation of the shifted second data value Y from the first is accomplished by utilizing the output of the self timed latch 105 as a bit mask to strip out the first encoded data value X to determine when the encoded second encoded data value Y is enabled on a second line.

Finally, the decoder 107B is interconnected with the separation logic 106, as shown, to receive and decode the shifted second data value Y from 4-to-1 encoding into the original 2-to-1 encoding that pertained to the second data Y for further subsequent processing. The decoder 107B also reverses back $Y_1(H)$ and $Y_1(L)$ so that the original encoding is reestablished for later processing of this operand.

2. Encoder

Figures 7A, 7C:
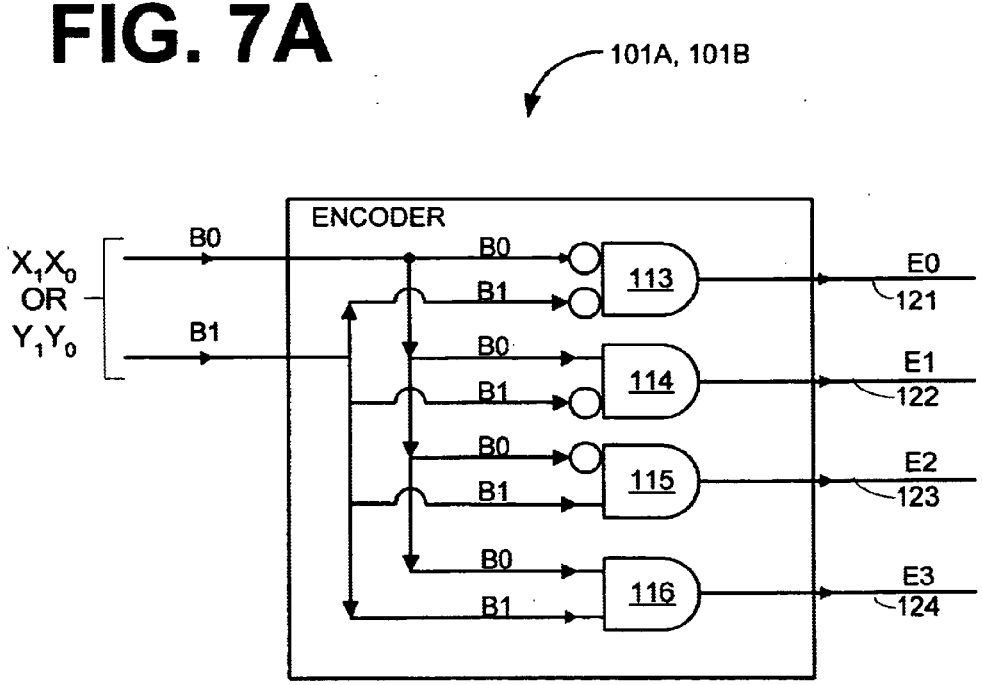
FIG. 7A is a block diagram of an encoder of FIG. 6.
FIG. 7C is a truth table showing the static logic translation that occurs in each encoder of FIGS. 6, 7A, and 7B.

Illustrated in FIG. 7A is a possible example of the architecture for each of encoders 101A, 101B (FIG. 6), which is identical in the preferred embodiment. The encoder 101 (101A and/or 101B) accepts two bits $B_1$, $B_0$ (either $X_1$, $X_0$ or $Y_1$, $Y_0$) of data of the operand (either X or Y). Other encoders (not shown for simplicity) encode the remaining bits of the operand (either X or Y) in a manner that is like that which is shown and described relative to bits $B_1$, $B_0$. These two bits $B_1$, $B_0$ of data are encoded in encoder 101 to trigger one and only one wire in the group of lines 121–124. This is accomplished by utilizing a circuit configuration such as that illustrated in FIG. 5A. The logic elements 113 through 116 create a circuit that is mutually exclusive and will trigger one and only one wire in the group of encoded data wires 121–124, for any combination of input bits $B_1$, $B_0$.

Figure 7B:
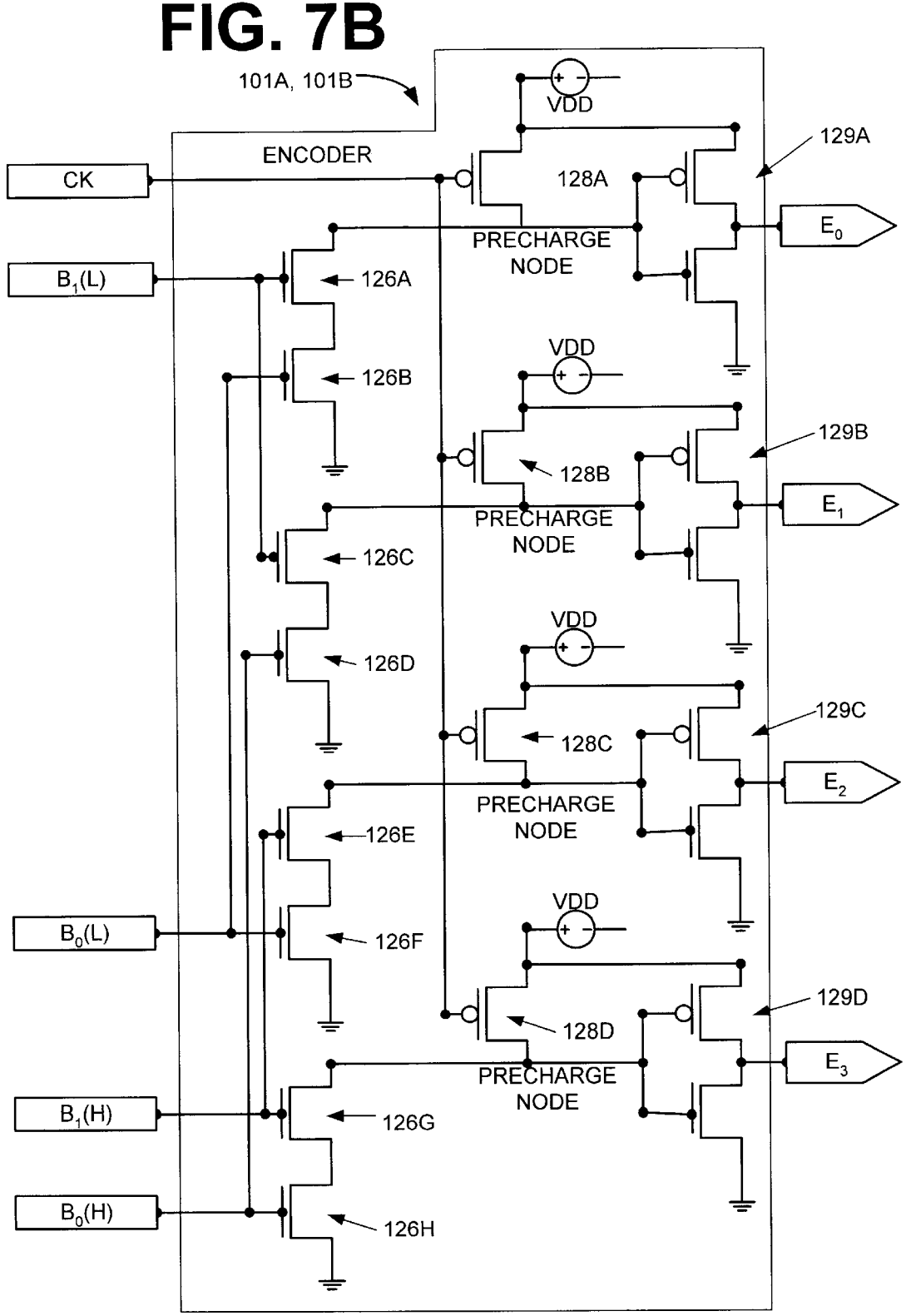
FIG. 7B is a circuit diagram of the encoder of FIGS. 6 and 7A.

FIG. 7B shows a specific implementation of the encoder 101 that is designed to implement a self-timed monotonic progression. The signals corresponding to bits $B_1(H)$, $B_1(L)$, $B_0(H)$, $B_0(L)$ are communicated to ladder logic transistors 126A–126H, which are preferably n-type metal-oxide-semiconductor field-effect transistors (well known as NMOSFETs) that have their respective gates operated by the inputs, as shown. The transistors 128A–128D, which are preferably p-type MOSFETs (well known as PMOSFETs), are used to precharge the precharge node with the voltage VDD, under the control of the clock signal CK. Encoders 101A, 101B, are both periodically precharged by clock 109 (FIG. 6), which is designed to precharge the dynamic logic during one half clock period (cycle) and permit logic evaluation (and discharge) during the other half logic period. Complementary MOSFET (each has both a PMOSFET for pulling high and an NMOSFET for pulling low) inverters 129A–129D are biased by the voltage VDD and are actuated by their respective precharge nodes. Thus, when the precharge node is precharged, the outputs $E_3$, $E_2$, $E_1$, $E_0$ are all driven low as the CMOSFETs effectively invert their respective inputs. Once one or two of the bits/lines $B_1(H)$, $B_1(L)$, $B_0(H)$, $B_0(L)$ transitions from low to high, then one of the precharge nodes will be pulled low (ground) and, subsequently, one of the outputs $E_3$, $E_2$, $E_1$, $E_0$ will transition from low to high, to essentially redefine the value of the set of bits/lines $B_1(H)$, $B_1(L)$, $B_0(H)$, $B_0(L)$.

Illustrated in FIG. 7C is logic truth table showing an example of the static encoding process associated with the encoder 101. As seen in the truth table, bits $B_1$, $B_0$ are defined by the set of bits/lines $B_1(H)$, $B_1(L)$, $B_0(H)$, $B_0(L)$. During encoding, these bits are redefined by translating them from a 2-bit/4-line encoding scheme, where each bit is defined by 2 lines by whether one of them transitions from low to high, to a 2-bit/4-line encoding scheme, where 2 bits are defined collectively by whether one of the lines transitions from low to high. As an example, initially, the logic state of bit $X_0$ of the first operand is defined by the set of $X_0(H)$ and $X_0(L)$, and the logic state of its neighboring bit $X_1$ in the same operand is defined by the set of $X_1(H)$ and $X_1(L)$. After encoding by encoders 101A, both X1 and X0 are defined by the set of logic values $E_3$, $E_2$, $E_1$, $E_0$.

FIG. 7D is a logic truth table showing an example of the dynamic encoding process that is implemented by the combination of encoders 101A, 101B when they encode two bits from each operand X, Y onto the same set of four bits/lines $E_3$, $E_2$, $E_1$, $E_0$. The first two columns show the original encoding of X, Y, and the last two columns show the re-encoding of X,Y, respectively. Note that the re-encoding of X bits occurs first and then the re-encoding of the Y bits occurs afterward. Further note that because of the connection switch at the input to encoder 101B pertaining to Y bits, there is no overlap of 1's in the encoding of $E_3$, $E_2$, $E_1$, $E_0$ for instances where $X_1X_0$ and $Y_1Y_0$ exhibit the same encoding. For example, see where $X_1X_0$ and $Y_1Y_0$ are both "00," and the former maps into "0001," the latter maps into "0100", and together they map into "0101." Note that "DC" in FIG. 7D means a don't care condition (and corresponds to unsupported encodings that are not within the mathematical relationship of the operand pairs).

3. Shifter

Illustrated in FIG. 8 is a possible example of a shifter 82. This shifter 82 is further described in detail in the following publicly available article: Craig Heikes and Glenn Colon-Bonet, "A Dual Floating Point Coprocessor With An FMAC Architecture, 1996 *IEEE International Solid State Circuits Conference*, pp. 254–255 (0-7803-3136-2/96), which is incorporated herein by reference. For simplicity, only a brief explanation of this design will be set out hereafter. Many other shifter designs are possible.

The design includes a hierarchical arrangement of multiplexers for essentially performing any desired shift in the data (first data X and second data Y). Encoder/drivers 131A–131G receive data from the groups of encoders 101 and communicate the data to multiplexers 133. The multiplexers 133 shift the data up to 16 bits to the left, or up to 16 bits to the right. The multiplexers 133 are directed on how many bits to shift by input 132 (from or derived from the leading bit anticipator 55, 94 of FIGS. 3, 5, respectively). The shifted outputs of multiplexers 133 are then input into multiplexers 135. Multiplexers 135 shift the shifted data up to four bits to the left, or up to four bits to the right. The amount of bits to be shifted and the direction of the shift are determined by input 134 (from or derived from the leading bit anticipator 55, 94 of FIGS. 3, 5, respectively). The outputs of multiplexers 135 are input into multiplexers 137. Multiplexers 137 shift the data up to one bit to the left or up to one bit to the right. Multiplexers 137 are directed by input 136 (from or derived from the leading bit anticipator 55, 94 of FIGS. 3, 5, respectively) on the direction of the one bit shift. That output of the transmission line shifter is then transmitted to the self timed data latches 105.

4. Self-Timed Latch

Figure 9:
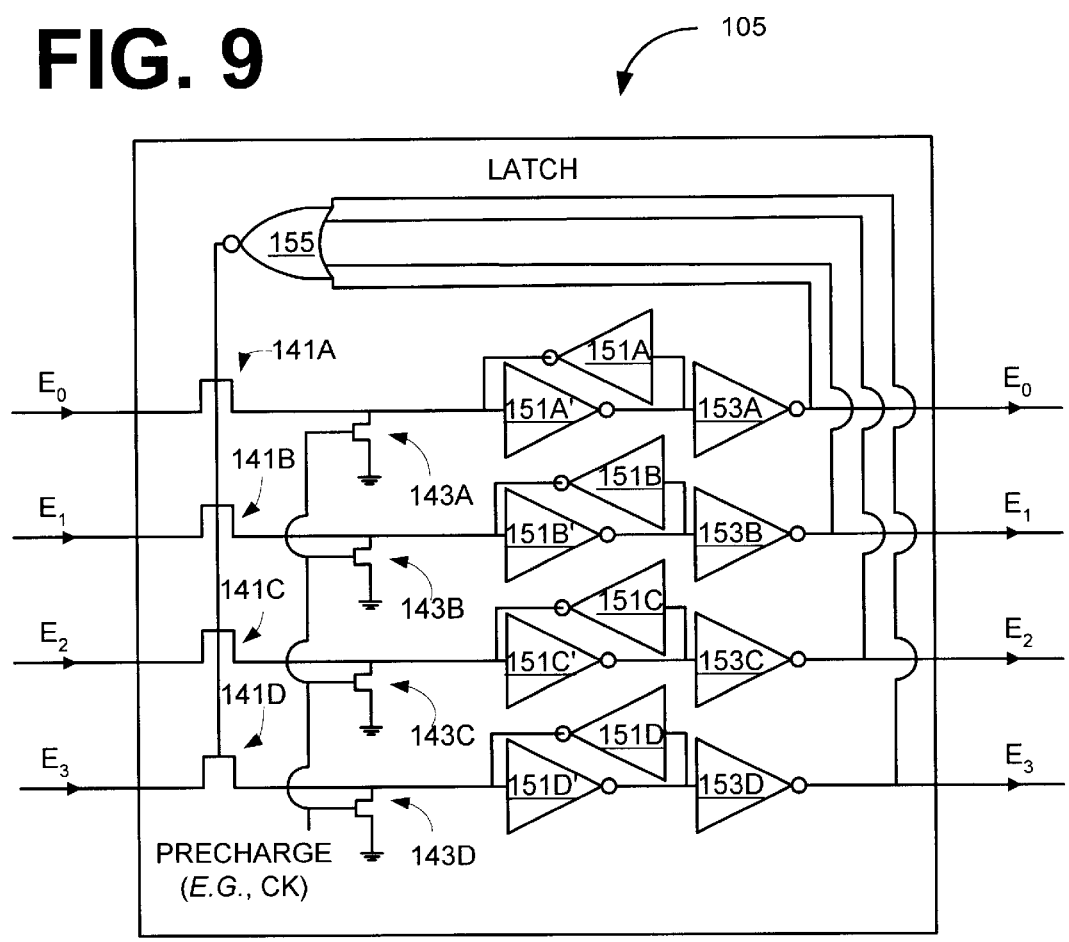
FIG. 9 is a block diagram of a self-timed latch of FIG. 6.

Illustrated in FIG. 9 is a possible example of a self-timed latch 105 (FIG. 6). The self-timed latch 105 includes circuitry that, upon the receiving the shifted first data X on logic paths $E_3$, $E_2$, $E_1$, $E_0$, disables further input. In other words, the self-timed latch 105 will latch X, not Y, and will thus enable ultimate separation of X and Y by appropriate logic.

The self-timed data latch 105 transmits the first data value X to the decoder 107A for decoding the value X from the 4-bit/line encoding back to 2-bit/line encoding. The self-timed data latch 105 provides the first encoded data value X to the separation logic 106 (FIG. 6) so that the separation logic 106 can separate the second data value Y from the first data value X. As noted above, the re-ordering logic 106 utilizes the first encoded data X provided by the self-timed data latch 105 to mask the first encoded data value from the outputs from the shifter 82 in order to determine the second encoded data value Y.

In architecture, as shown in FIG. 9, the set of logic paths $E_3, E_2, E_1, E_0$ are forwarded to the latch 105 and are received specifically by respective transistors 141A–141D, preferably NMOSFETs, which are used to prevent latching of the second data value Y after the first data value X has already been latched. As shown, they are actuated by the output from a NOR logic gate 155, which receives and performs a logical NOR operation upon the outputs of the latch 105. Accordingly, once there is a transition at one of the outputs, then the output of the OR logic gate 155 will transition low and all of the transistors 141A–141D will be turned off.

When the first data value X is communicated to the gate, the nodes 146 are all initially in a low state, having already been pulled low by respective transistors 143A–143D, which are actuated by the clock signal CK. The precharge period of the clock signal CK causes the nodes to be pulled low. When one of the lines $E_3, E_2, E_1, E_0$ transitions from low to high, then that high value is latched within the corresponding set of flip-flop inverters (15a, 151a' or 151b, 151b' or 151c, 151c' or 151d, 151d'). A set of the flip-flop inverters, for example, CMOSFET inverters, is associated with each of bits/lines $E_3, E_2, E_1, E_0$. Finally, the bits/lines $E_3, E_2, E_1, E_0$ are inverted by inverters 153A–153D, respectively, for example, CMOSFET inverters, and are ultimately passed to the decoder 107A.

5. Decoder

Figure 10:
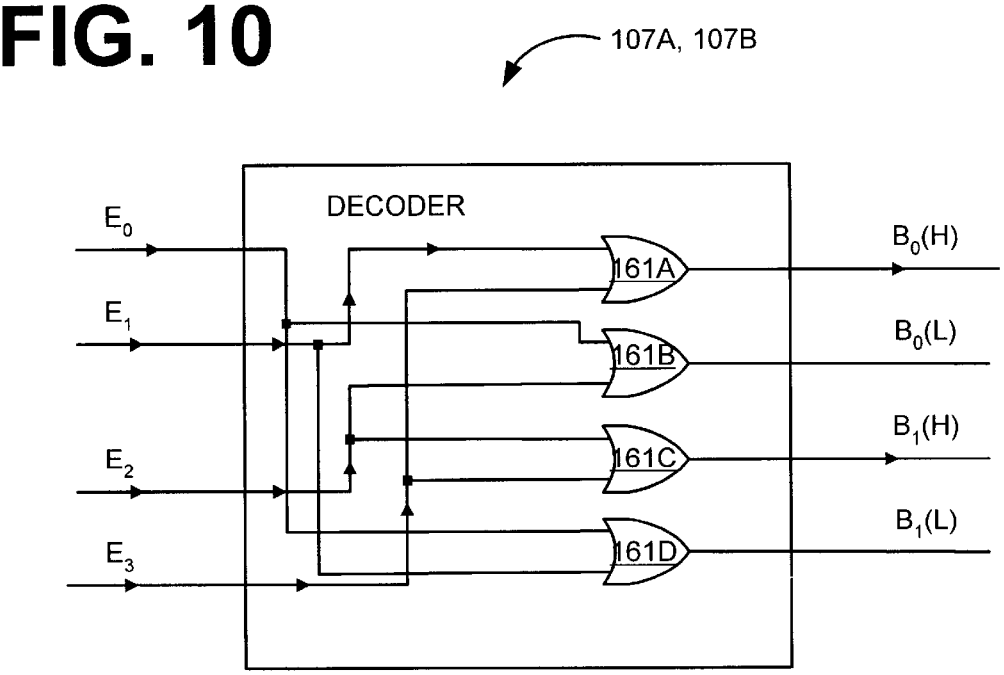
FIG. 10 is a block diagram of a decoder of FIG. 6.

Illustrated in FIG. 10 is a possible example of a decoder 107 (107A and/or 107B of FIG. 6)). The decoders 107A and 107B are identical in the preferred embodiments. The decoder 107 accepts inputs $E_3, E_2, E_1, E_0$ from the self timed latch 105 or the separation logic 106, whichever applicable, and decodes the 4-line/1-bit operand encoding to 2-line/1-bit operand encoding. This is accomplished by simply passing the signals through a set of OR logic gates 161A–161D as shown in FIG. 10. Needless to say, other decoding schemes are possible.

6. Conclusion

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A method for transmitting data operands, the method comprising:

receiving, on a first set of paths, a first data operand defined by a first encoding scheme;

receiving, on a second set of paths, a second data operand defined by the first encoding scheme;

redefining the first data operand by a second encoding scheme and transmitting the redefined first data operand onto a third set of paths;

redefining the second data operand by the second encoding scheme and transmitting the redefined second data operand onto the third set of paths;

processing the redefined first data operand in a self-timed manner;

successively processing the redefined second data operand in a self-timed manner, translating the processed first data operand back to the first encoding scheme and transmitting the translated first data operand onto a fourth set of paths;

translating the processed second data operand back to the first encoding scheme and transmitting the translated second data operand onto a fifth set of paths;

defining each of the first and second data operands by two logic variables;

redefining each of the first and second data operands by four logic variables;

performing a shifting operation upon each of the first and second data operands defined by four respective logic variables; and redefining each of the first and second data operands by two logic variables.

2. A method for transmitting data operands, the method comprising:

receiving, on a first set of paths, a first data operand defined by a first encoding scheme;

receiving, on a second set of paths, a second data operand defined by the first encoding scheme;

redefining the first data operand by a second encoding scheme and transmitting the redefined first data operand onto a third set of paths;

redefining the second data operand by the second encoding scheme and transmitting the redefined second data operand onto the third set of paths;

processing the redefined first data operand in a self-timed manner;

successively processing the redefined second data operand in a self-timed manner;, translating the processed first data operand back to the first encoding scheme and transmitting the translated first data operand onto a fourth set of paths; and translating the processed second data operand back to the first encoding scheme and transmitting the translated second data operand onto a fifth set of paths;

wherein the first encoding scheme includes a two-to-one encoding scheme and the second encoding scheme includes a four-to-one encoding scheme.

3. The method of claim 2, wherein successively processing the redefined second data operand further comprises delaying the second data operand.

4. The method of claim 3, further comprising:

exchanging bits of the delayed second data operand defined by the two-to-one encoding scheme.

5. The method of claim 3, further comprising:

combining the fast data operand and the delayed second data operand onto the third set of paths by communicating corresponding bits of the data operands though respective OR gates.

6. A method for transmitting data operands, the method comprising:
receiving, on a first set of paths, a first data operand defined by a first encoding scheme;
receiving, on a second set of paths, a second data operand defined by the first encoding scheme;
redefining the first data operand by a second encoding scheme and transmitting the redefined first data operand onto a third set of paths;
redefining the second data operand by the second encoding scheme and transmitting the redefined second data operand onto the third set of paths;
processing the redefined first data operand in a self-timed manner;
successively processing the redefined second data operand in a self-timed manner;
translating the processed fast data operand back to the first encoding scheme and transmitting the translated first data operand onto a fourth set of paths;
translating the processed second data operand back to the first encoding scheme and transmitting the translated second data operand onto a fifth set of paths;
latching the first and second data operands in succession after processing the redefined first and second data operands; and
separating the second data operand from the fist data operand after latching the first data operand and approximately when latching the second data operand.

7. A method for transmitting data operands, the method comprising:
receiving, on a first set of paths, a first data operand defined by a first encoding scheme;
receiving, on a second set of paths, a second data operand defined by the first encoding scheme;
redefining the first data operand by a second encoding scheme and transmitting the redefined first data operand onto a third set of paths;
redefining the second data operand by the second encoding scheme and transmitting the redefined second data operand onto the third set of paths;
processing the redefined first data operand in a self-timed manner;
successively processing the redefined second data operand in a self-timed manner;
translating the processed first data operand back to the first encoding scheme and transmitting the translated first data operand onto a fourth set of paths;
translating the processed second data operand back to the first encoding scheme and transmitting the translated second data operand onto a fifth set of paths;
translating the first data operand from a two-to-one encoding scheme to a four-to-one encoding scheme on the Bird set of paths;
delaying the second data operand;
translating the delayed second data operand from the two-to-one encoding scheme to the four-to-one encoding scheme on the third set of paths;
latching the first and second data operands in succession are processing the redefined fist and second data operands;
separating the second data operand from the first data operand after latching the first data operand and approximately when latching the second data operand; and
separately translating the first and second data operands from the four-to-one encoding scheme to the two-to-one encoding scheme.

8. A method for transmitting data operands, the method comprising:
receiving, on a first set of paths, a first data operand defined by a first encoding scheme;
receiving, on a second set of paths, a second data operand defined by the first encoding scheme;
redefining the first data operand by a second encoding scheme and transmitting the redefined first data operand onto a third set of paths;
redefining the second data operand by the second encoding scheme and transmitting the redefined second data operand onto the third set of paths;
processing the redefined first data operand in a self-timed manner;
successively processing the redefined second data operand in a self-timed manner;
translating the processed first data operand back to the first encoding scheme and transmitting the translated first data operand onto a fourth set of paths;
translating the processed second data operand back to the first encoding scheme and transmitting the translated second data operand onto a fifth set of paths;
pre-charging the first trough fifth sets of paths; and
implementing a monotonic progression along the first through fifth sets of paths.

9. A system for transmitting data operands, the system comprising:
means for receiving, on a first set of paths, a first data operand defined by a first encoding scheme and for receiving, on a second set of paths, a second data operand defined by the first encoding scheme, wherein the first encoding scheme defines the first and second data operands by two logic variables, the redefining means redefines each of the first and second data operands by four logic variables, and the translating means redefines each of the first and second data operands by two logic variables;
means for redefining the first and second data operands by a second encoding scheme;
means for transmitting the redefined first and second data operands onto a third set of paths;
means for successively processing the redefined first and second data operands in a self-timed manner;
means for translating the processed first and second data operands back to the first encoding scheme;
means for transmitting the translated first and second data operands onto respective fourth and fifth sets of paths; and
means for successively processing performs a shifting function upon each of the first and second data operands.

10. A system for transmitting data operands, the system comprising:
means for receiving, on a first set of paths, a first data operand defined by a first encoding scheme and for receiving, on a second set of paths, a second data operand defined by the first encoding scheme;
means for redefining the first and second data operands by a second encoding scheme, wherein the redefining means comprises:
means for re-encoding the first data operand from a two-to-one encoding scheme to a four-to-one encoding scheme on the third set of paths; and means for delaying the second data operand, the re-encoding means further re-encoding the delayed second data operand from the two-to-one encoding scheme to the four-to-one encoding scheme on the third set of paths;

means for transmitting the redefined first and second data operands onto a third set of paths;

means for successively processing the redefined first and second data operands in a self-timed manner;

means for translating the processed first and second data operands back to the first encoding scheme; and means for transmitting the translated first and second data operands onto respective fourth and fifth sets of paths.

11. The system of claim 10, wherein the translating means comprises:

means for latching the first and second data operands in a self-timed manner;

means for separating the latched first and second data operands;

means for receiving the first data operand from the latching means and for decoding the first data operand from four-to-one encoding to two-to-one encoding; and means for receiving the second data operand from the separating means and for decoding the second data operand from four-to-one encoding to two-to-one encoding.

12. The system of claim 10, further comprising a connection switchover means for changing the two-to-one encoding scheme prior to re-encoding the delayed second data operand.

13. A system for transmitting data operands, the system comprising:

means for receiving, on a first set of paths, a first data operand defined by a first encoding scheme and for receiving, on a second set of paths, a second data operand defined by the first encoding scheme;

means for redefining the first and second data operands by a second encoding scheme;

means for transmitting the redefined first and second data operands onto a third set of paths;

means for successively processing the redefined first and second data operands in a self-timed manner, wherein the means for successively processing further comprises:

means for latching the first and second data operands in a self-timed manner; and means for separating the latched first and second data operands;

means for translating the processed first and second data operands back to the first encoding scheme; and means for transmitting the translated first and second data operands onto respective fourth and fifth sets of paths.

14. A system for transmitting data operands, the system comprising:

means for receiving, on a first set of paths, a first data operand defined by a first encoding scheme and for receiving, on a second set of paths, a second data operand defined by the first encoding scheme;

means for redefining the first and second data operands by a second encoding scheme;

means for transmitting the redefined first and second data operands onto a third set of paths;

means for successively processing the redefined first and second data operands in a self-timed manner;

means for translating the processed first and second data operands back to the first encoding scheme;

means for transmitting the translated first and second data operands onto respective fourth and fifth sets of paths;

means for pre-charging the first through fifth sets of paths; and means for implementing a monotonic progression on the first through fifth sets of paths.

15. A processor comprising:

an encoder designed to receive first and second data operands from respective first and second sets of paths, the first and second data operands defined by a first encoding scheme, the encoder further designed to redefine the first and second data operands by a second encoding scheme and transit the redefined first and second data operands onto a third set of paths, wherein the first encoding scheme defines the first and second data operands by two logic variables, and the second encoding scheme defines the first and second data operands by four logic variables;

a device designed to process the redefined first and second data operands successively in time and in a self-timed manner; and a decoder designed to receive the processed first and second data operands in succession from the device, the decoder further designed to decode the first and second data operands onto respective fourth and fifth sets of paths.

16. A processor comprising:

an encoder designed to receive first and second data operands from respective first and second sets of paths, the first and second data operands defined by a first encoding scheme, the encoder further designed to redefine the first and second data operands by a second encoding scheme and transmit the redefined first and second data operands onto a third set of paths, wherein the encoder comprises:

a first encoder designed to translate the first data operand from two-to-one encoding to four-one-encoding on the third set of paths;

a delay device designed to impose a delay upon the second data operand; and a second encoder designed to translate the delayed second data operand from two-to-one encoding to four-to-one encoding on the third set of paths;

a device designed to process the redefined first and second data operands successively in time and in a self-timed manner; and a decoder designed to receive the processed first and second data operands in succession from the device, the decoder further designed to decode the first and second data operands onto respective fourth and fifth sets of paths.

17. The processor of claim 16, wherein the second encoder further comprises a crossover connection that switches bits of the delayed second data operand prior to translation by the second encoder.

18. A processor comprising:

an encoder designed to receive first and second data operands from respective first and second sets of paths, the first and second data operands defined by a first encoding scheme, the encoder further designed to redefine the first and second data operands by a second encoding scheme and transmit the redefined first and second data operands onto a third set of paths;

a device designed to process the redefined first and second data operands successively in time and in a self-timed manner; and a decoder designed to receive the processed first and second data operands in succession from the device, the decoder further designed to decode the first and second data operands onto respective fourth and fifth sets of paths, wherein the decoder further comprises:

a self-timed latch designed to receive the first and second data operands from the device; and separation logic designed to receive the first and second data operands in succession from the self-timed latch and for separating the second data operand from the first data operand.

19. A processor comprising:

an encoder designed to receive first and second data operands from respective first and second sets of paths, the first and second data operands defined by a first encoding scheme, the encoder further designed to redefine the first and second data operands by a second encoding scheme and transmit the redefined first and second data operands onto a third set of paths;

a device designed to process the redefined first and second data operands successively in time and in a self-timed manner; and a decoder designed to receive the processed first and second data operands in succession from the device, the decoder farther designed to decode the first and second data operands onto respective fourth and fifth sets of paths, wherein the decoder further comprises:

a self-timed latch designed to receive the first and second data operands from the device:

separation logic designed to receive the fist and second data operands in succession from the self-timed latch and for separating the second data operand from the fist data operand;

a first decoder designed to receive the first data operand from the self-timed latch and designed to decode the first data operand from four-to-one encoding to two-to-one encoding; and a second decoder designed to receive the second data operand from the separation logic and designed to decode the second data operand from four-to-one encoding to two-to-one encoding.

20. A processor comprising:

an encoder designed to receive first and second data operands from respective first and second sets of paths, the first and second data operands defined by a first encoding scheme, the encoder further designed to redefine the first and second data operands by a second encoding scheme and transmit the redefined first and second data operands onto a third set of paths;

a device designed to process the redefined first and second data operands successively in time and in a self-timed manner; and a decoder designed to receive the processed first and second data operands in succession from the device, the decoder further designed to decode the first and second data operands onto respective fourth and fifth sets of paths;

wherein the encoder, device, and decoder implement a monotonic progression.

* * * * *